Patented Mar. 26, 1935

1,995,928

UNITED STATES PATENT OFFICE 1,995,928

AZO DYESTUFF AND ITS PRODUCTION

Max Albert Kunz, Mannheim, and Hans Krzikalla and Walter Limbacher, Ludwigshafen-on-the-Rhine, Germany, assignors to General Aniline Works, Inc., New York, N. Y., a corporation of Delaware No Drawing. Application November 25, 1933, Serial No. 699,800. In Germany December 16, 1932

5 Claims. (Cl. 260—86)

The present invention relates to new azo dyestuffs and a process of producing same.

We have found that valuable azo dyestuffs are obtained by coupling an 8-aminoquinoline with any suitable diazo compounds free from arsenic. The term diazo compounds is intended to include derivatives of aromatic mono- and polyamines in which one or more amino groups are diazotized. The expression "an 8-aminoquinoline" is meant to include 8-aminoquinoline itself and derivatives thereof. As derivatives of 8-aminoquinoline may be mentioned for example 5-methyl-, 5-chloror 5-alkoxy-8-aminoquinolines or 8-aminoquinoline-5-sulphonic acid. The 8-aminoquinolines to be used are capable of coupling which property is usually due to the fact that an orthoor para-position to the amino group in the 8-position is unsubstituted. Monoazo, disazo or polyazo dyestuffs may be prepared in this way. They are capable of being employed for a great variety of purposes, as for example for dyeing leather, wool, cotton, viscose, artificial silk or natural silk or lacquers. Those of the dyestuffs which contain sulpho groups may be used for preparing lakes. Generally speaking, the dyestuffs derived from 8-aminoquinolines having a free para-position to the amino group or from diazotized ortho-aminophenols may be employed as after-chroming dyestuffs, and they may also be converted in substance into complex metal compounds by the usual methods.

The following examples will further illustrate the nature of this invention but the invention is not restricted to these examples. The parts are by weight.

Example 1

17.3 parts of metanilic acid are diazotized in the usual manner and the resulting solution of the diazo compound is allowed to flow into an aqueous hydrochloric acid solution of 15.8 parts of 8-aminoquinoline. The coupling sets in immediately and is carried to its end by the addition of an excess of sodium acetate or pyridine. The resulting dyestuff, in the form of its sodium salt, dissolves in water giving a yellow coloration which changes to violet upon acidification for example with hydrochloric acid. The dyestuff dyes wool orange shades; if the dyeing be aftertreated with bichromate or if the dyeing be effected on chrome-mordanted wool a fast brown dyeing is obtained.

If the dyestuff be boiled with a solution of chromium formate a dyestuff is obtained which dyes wool and leather fast brown shades.

Example 2

24.2 parts of 3.4-dichloraniline-6-sulphonic acid are diazotized in the usual manner and the resulting solution of the diazo compound is added to an aqueous hydrochloric acid solution of 15.8 parts of 8-aminoquinoline. The coupling is carried to completion by the addition of an excess of sodium acetate. A dyestuff is obtained which dyes wool orange shades; by aftertreating the dyeing with bichromate or by dyeing on chrome-mordanted wool, a fast yellow-brown dyeing is obtained. The dyestuff may also be chromed in substance and then yields a chromium compound which goes on wool and leather.

In order to prepare the complex copper compound of the dyestuff it is boiled with copper sulphate or tetramino cupric sulphate. In a similar manner other metal compounds, as for example iron or nickel compounds, may be prepared.

Components which are suitable for the preparation of further dyestuffs and the color of the dyeings obtainable with the dyestuffs and of the chromed dyestuffs are given in the following table:—

| Diazo component | Coupling component | Dyeing | Dyeing after being chromed or dyed on chrome-mordanted fibre |
|---|---|---|---|
| Sulphanilic acid | 8-Amino-quinoline | Orange | Brown. |
| 4-Chloraniline-2-sulphonic acid | do | do | Yellow-brown. |
| 4-Chloraniline-3-sulphonic acid | do | do | Brown. |
| 3-Chloraniline-6-sulphonic acid | do | do | Yellow-brown. |
| 6-Chlor-3-toluidine-4-sulphonic acid | do | do | Do. |
| 4-Toluidine-2-sulphonic acid | do | do | Brown. |
| 2-Anisidine-4-sulphonic acid | do | do | Do. |
| Para-nitraniline-ortho-sulphonic acid | do | Red | Bordeaux red. |
| Naphthionic acid | do | do | Red-brown. |
| 2.6.8-Naphthylamine-disulphonic acid | do | Brown | Yellow-brown. |
| Picramic acid | 8-Aminoquinoline-5-sulphonic acid | Yellow-brown | Brown. |
| Metanilic acid | 8-Aminoquinaldine | Orange | Do. |
| 1-Methyl-3-amino-4-methoxy-benzene-6-sulphonic acid | do | do | Do. |
| 1-Amino-4-nitrobenzene-2-sulphonic acid | do | Brown | Red-brown. |
| Picramic acid | 8-Aminoquinaldine-5-sulphonic acid | Yellow-brown | Brown. |

Example 3

The diazo compound prepared from 16.2 parts of 2.5-dichloraniline is coupled with an aqueous solution of 27 parts of 8-aminoquinoline-5-sulphonic acid sodium salt and the coupling is carried to its end by the addition of an excess of sodium acetate. A dyestuff is obtained which dyes wool orange shades.

Example 4

9.3 parts of aniline are diazotized and the resulting solution of the diazo compound is added to an aqueous hydrochloric acid solution of 15.8 parts of 8-aminoquinoline. A dyestuff is obtained which dyes acetate silk orange shades of very good fastness to washing and which may also be employed for coloring cellulose ester lacquers.

Example 5

13.8 parts of para-nitraniline are diazotized and the resulting solution of the diazo compound is added to an aqueous hydrochloric acid solution of 15.8 parts of 8-aminoquinoline. A dyestuff is obtained which dyes acetate silk red shades of very good fastness to washing and which may also be employed for coloring cellulose ester lacquers.

Example 6

The tetrazo compound obtainable from 40.2 parts of 4.4'-diaminodiphenylurea-3.3'-disulphonic acid is coupled with an aqueous hydrochloric acid solution of 31.6 parts of 8-aminoquinoline. A dyestuff is obtained which dyes silk brown shades and which dyes cotton brown shades which change to blue by aftertreatment with copper sulphate.

Example 7

21.3 parts of 1-amino-4-nitro-benzene-2-sulphonic acid are diazotized in the usual manner and the solution obtained is allowed to flow into an aqueous hydrochloric acid solution of 17.3 parts of 8-aminoquinaldine. The coupling begins at once; an excess of sodium acetate is added in order to complete it. A dyestuff is obtained dyeing wool brown shades which by after-treatment with bichromate turn to fast red-brown shades; dyeings of similar shades are obtained by using chrome-mordanted wool. The dyestuff may also be chromed in substance yielding a complex chromium compound which may be used for dyeing wool or leather.

Example 8

20.7 parts of 1-amino-3-chloro-benzene-6-sulphonic acid are diazotized in the usual manner and the solution obtained is added to an aqueous hydrochloric acid solution of 17.3 parts of 8-aminoquinaldine. The coupling is completed by the addition of an excess of sodium acetate. A dyestuff is obtained which goes on wool yielding orange shades which upon after-treatment with bichromate turn to fast brown shades which latter may be obtained also when chrome-mordanted wool is dyed.

What we claim is:

1. The process of producing azo dyestuffs which comprises coupling an 8-aminoquinoline containing at least 1 position at which azo coupling may take place with an aromatic diazo compound free from arsenic.

2. Azo dyestuffs of the aromatic series free from arsenic and containing as end coupling component an 8-aminoquinoline.

3. The azo dyestuff corresponding to the formula

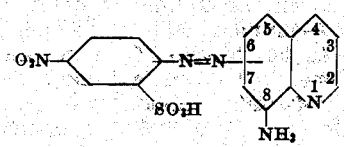

wherein the azo group is attached to the quinoline nucleus in either the 5- or 7-position.

4. The azo dyestuff corresponding to the formula

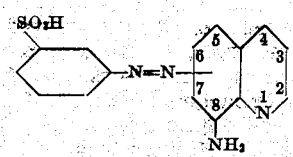

wherein the azo group is attached to the quinoline nucleus in either the 5- or 7-position.

5. The azo dyestuff corresponding to the formula

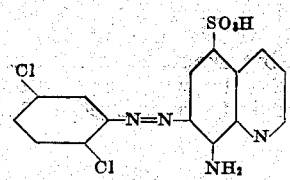

MAX ALBERT KUNZ.
HANS KRZIKALLA.
WALTER LIMBACHER.